United States Patent
Unger (10) Patent No.: US 8,719,798 B2
(45) Date of Patent: May 6, 2014

(54) SYSTEM AND METHOD FOR SOFTWARE LOGGING

(75) Inventor: Bob Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1680 days.

(21) Appl. No.: 11/832,584

(22) Filed: Aug. 1, 2007

(65) Prior Publication Data

US 2009/0037894 A1    Feb. 5, 2009

(51) Int. Cl.
*G06F 9/44* (2006.01)
*G06F 11/34* (2006.01)
*G06F 11/36* (2006.01)

(52) U.S. Cl.
CPC ............. *G06F 8/20* (2013.01); *G06F 11/3476* (2013.01); *G06F 11/3624* (2013.01)
USPC ........................................................ 717/130

(58) Field of Classification Search
CPC .... G06F 11/3476; G06F 11/3624; G06F 8/20
USPC ........................................................ 717/130
See application file for complete search history.

(56) References Cited

U.S. PATENT DOCUMENTS

| | | | |
|---|---|---|---|
| 5,742,754 A | 4/1998 | Tse | |
| 5,845,120 A | 12/1998 | Reddy et al. | |
| 6,058,494 A | 5/2000 | Gold et al. | |
| 6,202,199 B1 | 3/2001 | Wygodny et al. | |
| 6,915,457 B1 | 7/2005 | Miller | |
| 6,963,339 B2 * | 11/2005 | Leah et al. | 345/440 |
| 7,401,322 B1 * | 7/2008 | Shagam et al. | 717/128 |
| 2002/0199172 A1 * | 12/2002 | Bunnell | 717/128 |
| 2005/0273665 A1 | 12/2005 | Menadue | |

OTHER PUBLICATIONS

"Logging Services—Introduction," 2 pages, http://logging.apache.org.

* cited by examiner

*Primary Examiner* — Wei Zhen
*Assistant Examiner* — Lanny Ung
(74) *Attorney, Agent, or Firm* — Fitch, Even, Tabin & Flannery LLP (57) ABSTRACT

System and method for providing logging information associated with development of executable program code. The method may include inserting a plurality of logging information elements into program code, the plurality of logging information elements having at least one logging parameter associated with the program code. In one embodiment, filtering criteria may be defined corresponding to the at least one logging parameter. In another embodiment, the program code may be filtered based on the filtering criteria. According to another embodiment, a result of the filtering may be provided including a subset of the plurality of logging information elements corresponding to said filtering criteria.

33 Claims, 5 Drawing Sheets

SYSTEM AND METHOD FOR SOFTWARE LOGGING

FIELD OF THE INVENTION

The present invention relates in general to a method and system for providing logging information of program code, more particularly to providing customizable logging information elements during build and execution.

BACKGROUND

Log statements have been traditionally inserted into software code during development to provide trace execution. Log statements may be useful for debugging and providing an understanding of operational characteristics. However, these non-coordinated log statements, as conventionally utilized, often fail to provide useful information to developers and users of the code. In general, end users and other developers usually have little knowledge of schemes used other than their own. What is useful information at one point may provide little or no information at different point in time or to a different developer. As such, log message may convey little to no information of the development process. Conventional methods additionally use verbose code schemes that may impact code size and operation speed thereby prohibiting the use of detail log statements in source code. Additionally, conventional logging methods fail to provide a method for log information to be selectively accessed by interested parties.

While conventional logging methods provide for messages to be deposited into source code during development, such methods struggle to provide useful information to interested parties. Accordingly, there is a need in the art to provide a system or method able to provide a logging method which overcomes the aforementioned drawback.

BRIEF SUMMARY OF THE INVENTION

Disclosed and claimed herein are a system and method for providing logging information associated with development of executable program code. In one embodiment, the method includes inserting a plurality of logging information elements into program code, the plurality of logging information elements having at least one logging parameter associated with the program code. The method includes defining filtering criteria corresponding to the at least one logging parameter, filtering the program code based on the filtering criteria and providing a result of the filtering including a subset of the plurality of logging information elements corresponding to said filtering criteria.

Other aspects, features, and techniques of the invention will be apparent to one skilled in the relevant art in view of the following detailed description of the invention.

DETAILED DESCRIPTION OF EXEMPLARY EMBODIMENTS

One aspect of the invention is directed to logging information related to development of program code. In one embodiment, a consistent and coordinated method is provided to specify information to be logged. Accordingly, a method is provided such that a user may insert logging information elements into program code during development. Logging information elements may be associated with one or more of a development event, error diagnosis and service needs. Events of particular importance may be noted and marked as such with logging information elements. In one embodiment, logging information elements may include a plurality of parameters to specify at least one of a specific line of program code and program code in general. As such, the logging information elements may be implemented to provide minimal impact on code size and execution time. Use of the logging information elements may be facilitated through minimal manual operation. As used herein, the term "program code" refers to anyone of source code, object code, machine code or any other form of computer code in general.

Another aspect of the invention is to provide a consistent and coordinated format for the aforementioned logging information elements. In one embodiment, logging information elements may be characterized by a specific format having at least one parameter to provide program code with usable information. Logging information elements may be supported by at least one library file associated with the program code. According to another embodiment, program code may be partitioned into modules, such that logging information elements include parameters referencing the modules.

According to another aspect of the invention, program code may be filtered to provide logging information elements contained in the program code. Filtering criteria may be provided such that logging information elements meeting the criteria may be selectively provided to a user. In one embodiment, logging information elements may be filtered when program code is compiled. In another embodiment, logging information elements may be filtered during execution of the program code. As such, it may be appreciated that multiple levels of filtering may be performed on logging information elements contained in program code based on multiple levels of criteria. In another embodiment, filtering criteria may be established based on one or more of user-defined inputs and system-defined levels. Logging information elements may be preserved in the program code based on the filtering criteria. To that end, released program code may contain logging information elements.

Another aspect is to provide a system for debugging program code using logging information elements. In one embodiment, filtering may be performed on program code to locate logging information elements to aide in forensic analysis. A capture log may be generated to provide logging information elements corresponding to filtering criteria. According to another embodiment, trace reconstruction may be performed based on a result of filtering. Resulting logging information elements may provide information on development decisions affecting code functionality, and the location of the logging information elements in the program code.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc. The code segments may be downloaded via computer networks such as the Internet, Intranet, etc.

Figure 1:
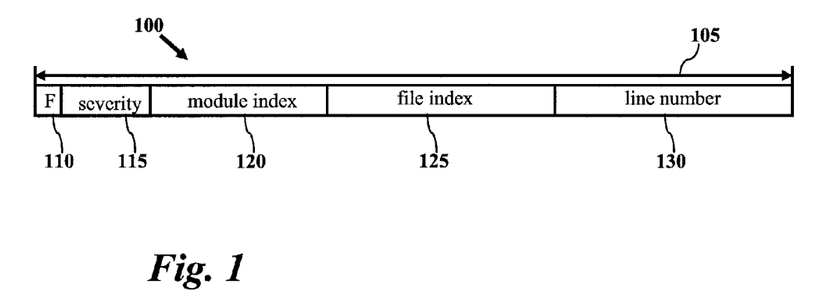
FIG. 1 depicts logging information element structure, according to one embodiment of the invention.

Referring now to the drawings, FIG. 1 illustrates a configuration for a logging information element 100, according to one or more aspects of the invention. In one embodiment, logging information elements may include a plurality of configurations. According to another embodiment, logging information elements may be configured to provide a consistent and coordinated format to specify logging information associated with development of program code. As such, logging information elements may function as footprints or markers in the execution path through the program code. The logging information elements may be inserted by a user issuing a function call. In one embodiment, function calls may be provided by way of a macro expansion. According to another embodiment, a function call may be supported by a library file. Logging information element 100 may have a predetermined bit range 105. In embodiment, bit range 105 may be limited to 32 bits. It may be appreciated that bit range 105 may vary. According to another embodiment, logging information element 100 may include a plurality of logging parameters. Logging information parameters may include one or more of a flag parameter 110, severity indicator 115, a module index 120, a file index 125, a line number 130 and a development message. Flag parameter 110 may be utilized to indicate the presence of a parameter value. Severity indicator 115 may be used to indicate a level of importance of a footprint. In one embodiment, severity indicator 115 may correspond to 8 levels of importance. Table I provides logging information element severity level according to one embodiment of the invention.

TABLE 1

| Severity Level | Level Description |
| --- | --- |
| 7 | Fatal |
| 6 | Error |
| 5 | Warning |
| 4 | Milestone |
| 3 | Information |
| 2 | Debug |
| 1 | Details |
| 0 | Fine Detail |

In one embodiment, severity levels may be layered to convey importance such that severity levels with a larger number may correspond to higher importance. According to another embodiment, logging information element 100 may include a module index 120. Module index 120 may be used to indicate a module tag of the program code. In one embodiment, module index 120 may provide a shorthand value for the corresponding text string of a module name. As shown in more detail below with respect to FIG. 2, each branch of the program code may be labeled with one of a plurality of module tags (e.g., module tags $210_{1-n}$). In one embodiment, module tags may have a 6 bit value. Logging information element 100 may include a file index parameter 125 to provide a unique value used to identify a portion of program code. As such, file index 125 may provide a shorthand value for the corresponding text string of a file name. In one embodiment, file index parameter 125 may provide up to 1792 files. Logging information element 100 may include line number parameter 130 to provide a location of logging information element in program code. According to another embodiment, a logging information element 100 may include comments related to program code development by reference to the line number of the program code. Comments may be included by reference without having to carry the characters and associated processing as part of the logging information element. By outputting a program code file index 125 and line number 130, comments in program code may be located.

According to one aspect of the invention, a function call may be used to issue logging information element 100 from the executing code. As provided in Table 2, function call is shown for logging information element 100 according to one or more embodiments of the invention.

TABLE 2

| Logging Information Element | Description |
| --- | --- |
| footprint * ( ); | Logging information element having minimal impact |
| footprint * (param); | Single parameter rider |
| footprint * ("fmt", params . . . ); | Display functionality |

* denotes severity level, see Table 1

By invoking a function call, such as "footprint" as shown in Table 2, and additional parameters, a user may issue a logging information element into program code. In one embodiment, a function call may be supported by library file. Program code may reference the library file to support the function calls.

Figure 2:
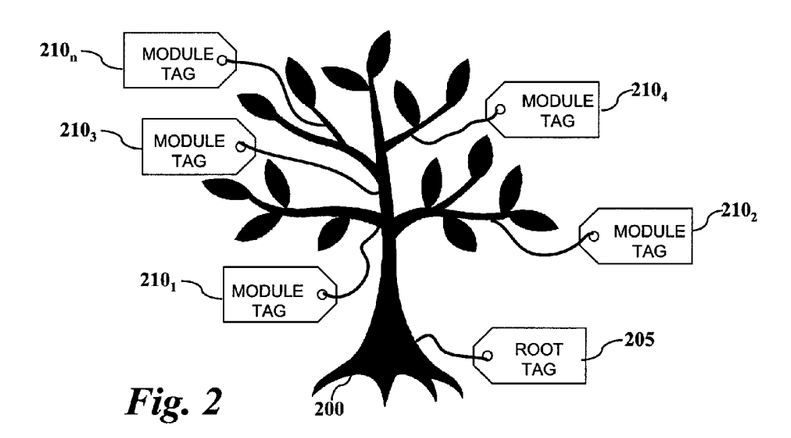
FIG. 2 depicts an illustration of assigned regions of program code, according to one embodiment of the invention.

Referring now to FIG. 2, a representation of program code is shown according to one embodiment of the invention. As shown, program code may be structured as a program code tree 200. According to one embodiment, each branch of the program code tree 200 may be labeled with one of a plurality of module tags $210_{1-n}$. The program code tree may include a root module tag, shown as root tag 205. According to one embodiment, root tag 205 may apply as to program code files that are not on a branch with a tag specified for that branch. Further, root tag 205 may be system generated as a global module tag. In one embodiment, module tags $210_{1-n}$ may be system generated to identify branches of the program code specific to a process. According to another embodiment, module tags may be inserted by a user. As such, module tags may be used to identify regions of program code tree 200 when included in filtering criteria (e.g., block 210, defining filtering criteria). In one embodiment, module tag files may include details of the module including at least one of module name, short hand code, default thresholds and comments.

Figure 3A:
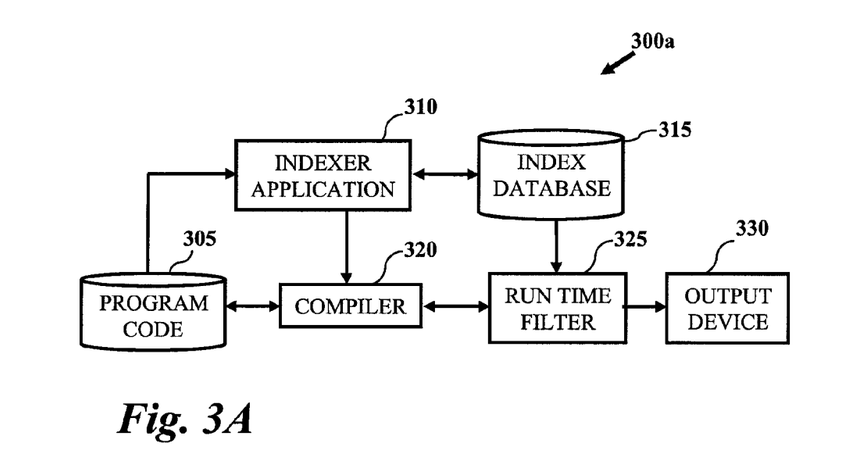
FIGS. 3A-3B depict embodiments of simplified system diagrams of one or more embodiments of the invention.
Figure 3B:
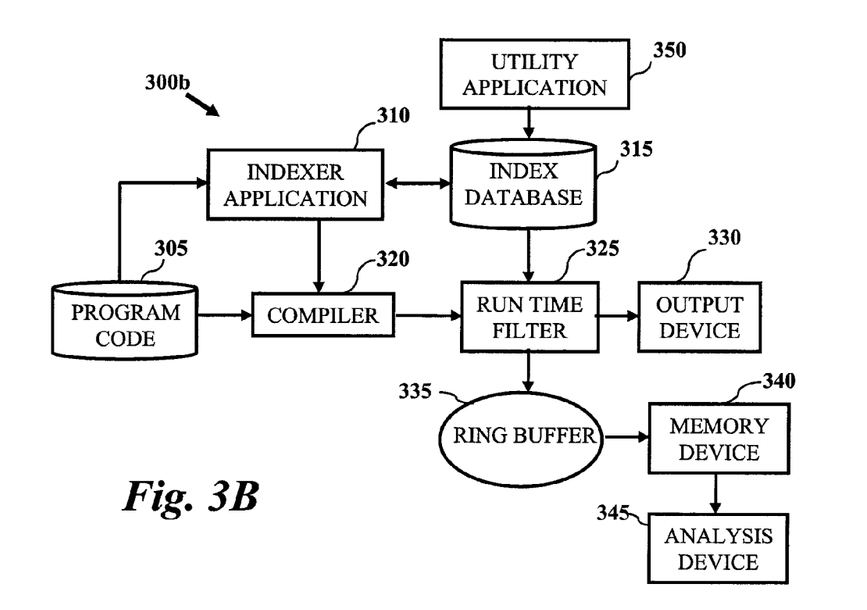

FIGS. 3A-3B illustrate one or more embodiments of systems 300a and 300b for providing logging information elements. Referring to FIG. 3A, system 300a as shown includes program code 305, indexer application 310, index data base 315, compiler 320, run-time filter 325 and output device 330. In one embodiment program code 305 may be provided to indexer application 310. Indexer application 310 may be configured to provide file indexes with corresponding file names of program code 305 to index database 315. Index application 310 may be configured to maintain index database 315. According to another embodiment, indexer application 310 may be configured to supply compiler 320 with at least one of a compile threshold, module index and file index associated with the file being compiled.

In one embodiment, program code 305 may be provided from a memory such as random access memory or read only memory. Compiler 320 may be configured to compile and optionally filter program code 305. According to another embodiment, compiler 320 may be configured to filter logging information elements (e.g., logging information element 100) from program code based on filtering criteria. As described in more detail below with respect to FIGS. 4A-4C, filtering criteria may be defined through selecting a range of values corresponding to at least one logging parameter. According to another embodiment, filtering criteria may be associated with a severity level of a logging information element, such that a threshold may be defined corresponding to a severity level. As such, compiler 320 may be configured to disregard logging information elements that do not meet a first predefined threshold. Compiler 320 may further be configured to compile logging information elements exceeding a second predetermined threshold into a formatted string. Compiler 320 may generate the formatted string using a macro definition file if threshold criteria are met. Logging information elements below the second threshold may be compiled as a minimal code element providing a footprint in the program code. In one embodiment, compiler 320 may be configured to compile logging information elements with reduced information, such that logging information elements providing at least one parameter may be compiled into a logging information element stripped of the parameter.

According to another embodiment, indexer application 310 may be configured to build an index of modules and files. Index database 315 may be configured to store index files and logging parameters associated with program code 305. In one embodiment, the index may include at least one of data associated with paths related to files indexed, a module count, a module structure table and a string table. The index for a file may be passed to compiler 320 for use by a logging information element macro embedded in the program code. The module structure table may include at least one of a module name pointer, path name pointer count of long files, count of normal length files, a pointer to long file names and a pointer to normal length file names.

Run-time filter 325 may be configured to execute and selectively filter program code 305 during a run-time operation. Results and output of the run-time filter 325 may be output on output device 330. In one embodiment, output device 330 may provide at least one of displaying, logging, and storing logging information elements. According to another embodiment, logging information elements above a predetermined threshold may be output for analysis to output device 330. Similarly, logging information elements above an additional threshold may be output such that they are displayed.

FIG. 3B depicts system 300b according to one embodiment of invention, As shown, system 300b may be similarly configured as system 300a to include program code 305, indexer application 310, index data base 315, compiler 320, run-time filter 325 and output device 330. System 300b may additionally include ring buffer 335, memory 340 and analysis device 345 and utility application 350. In one embodiment, ring buffer 335 may be provided to facilitate buffering of data streams from run-time filter 325. Ring buffer 335 may additionally provide temporary storage of data associated with run-time filtering. Memory 340 may be configured to store data provided by ring buffer 335, and further provide the data to analysis device 345. In another embodiment of the invention, contents of ring buffer 335 may be copied to memory 340. As such, a function call may be used to copy data in the ring buffer 335 to the memory 340. According to another embodiment, the analysis device 345 may be one or more of a computer, a display and an output device in general configured to provide a user with a filtering result. To that end, analysis device 345 may be configured to provide one or more of a user interface for run-time filtering, remove log items from memory, format information for display, send text in program code to the display device and write information to files on internal and external devices.

According to another embodiment, system 300b may include utility application 350 may be provided to set filtering thresholds. Utility application 350 may provide one or more of listing current thresholds for each module, performing global settings of thresholds for all modules, and setting thresholds for a particular module. Utility application 350 may be coupled to index database 315 such that filtering thresholds may be stored.

Figure 4A:
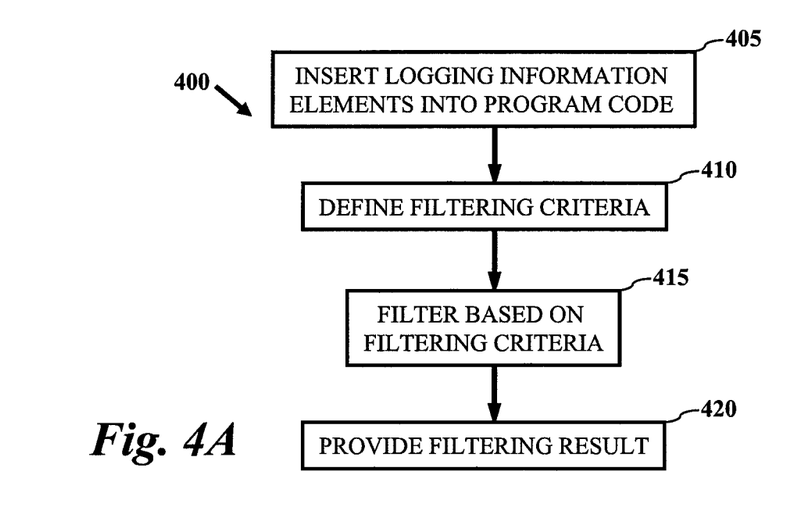
FIGS. 4A-4C depict processes for filtering program code, according to one or more embodiments of the invention.
Figure 4B:
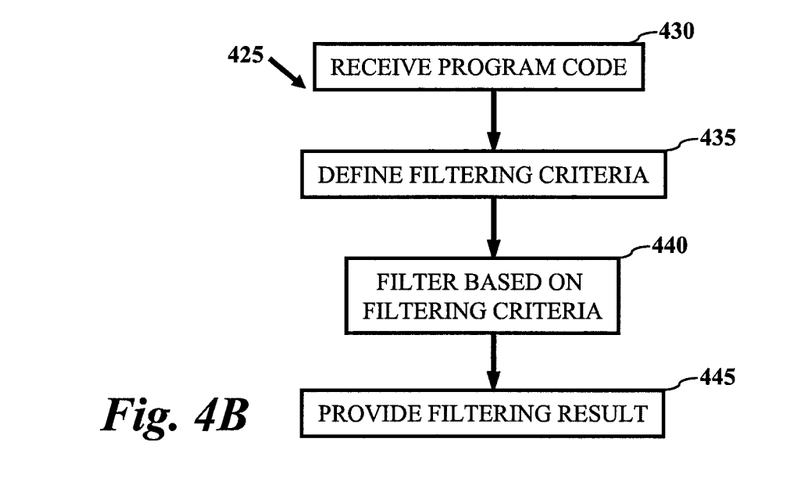
Figure 4C:
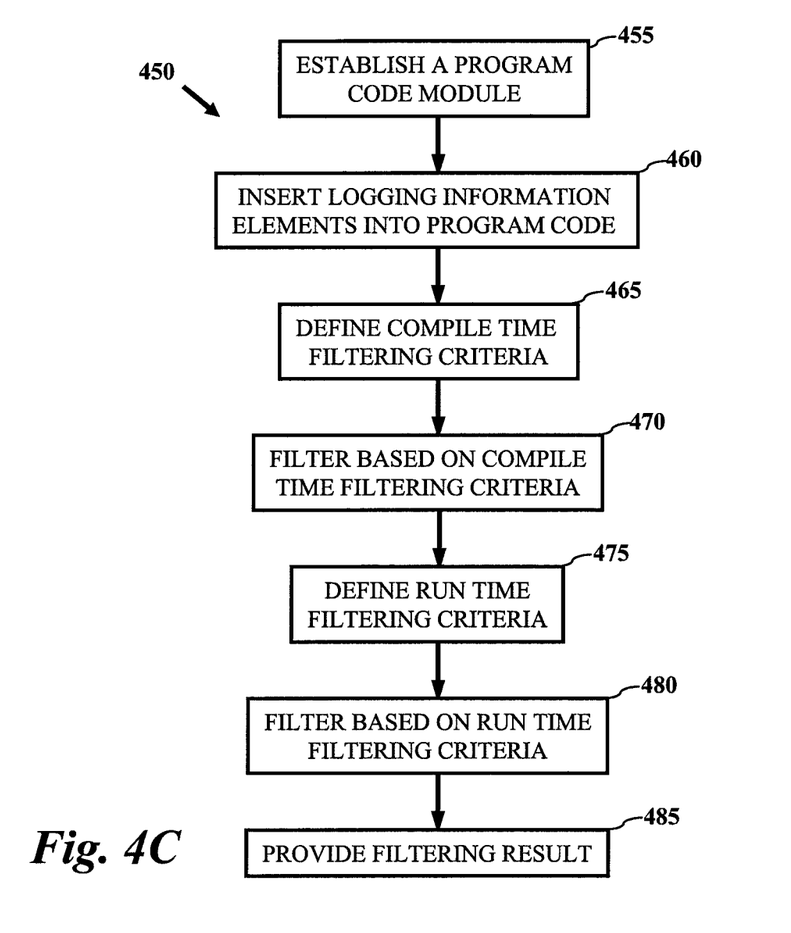

Referring now to FIGS. 4A-4C, processes for filtering program code are described according to one or more embodiments of the invention. Referring first to FIG. 4A, process 400 may be initiated by inserting a plurality of logging information elements (e.g., logging information element 100) into program code as depicted at block 405. In one embodiment, the plurality of logging information elements may include at least one logging parameter associated with the program code. As such, logging information elements may function as program code footprints or markers for a developer or a user. The logging information elements may be inserted by a user issuing a function call. In one embodiment, function calls may be provided by a macro operation. According to another embodiment, a function call may be supported by a library file. Developers may insert a function call by providing a command element associated with the library file and developer-specific values. Function calls may exhibit low impact on size and execution time of program code according to another embodiment of the invention.

At block 410 of process 400, filtering criteria may be defined. In one embodiment, filtering criteria may correspond to at least one logging parameter. According to another embodiment, filtering criteria may be defined through selecting a range of values corresponding to said at least one logging parameter. Filtering criteria may be specific to one or more of compile-time filtering criteria and run-time filtering criteria. According to another embodiment, a utility application (e.g., utility application 350) may be provided to set filtering thresholds. The utility application may provide one or more of listing current thresholds for each module, performing global settings of thresholds for all modules, and setting thresholds for a particular module.

Once the filtering criteria have been defined at block 410, process 400 continues to block 415 where program code may be filtered based on the filtering criteria of block 410. In one embodiment, filtering of the program code may be performed when program code is compiling. As such, filtering may be based on compile-time filtering criteria. According to another embodiment, the program code may be filtered while operating the program code based on run-time filtering criteria. Although not depicted in FIG. 4A, process 400 may include additional layers of filtering. Filtering may be based on one or more of user-specified and system defined thresholds. In yet another embodiment, filtering may be customized for each module. Criteria for filtering based on a particular module may be defined by the aforementioned threshold application. As may be appreciated, logging information elements may be preserved in released program code.

Block 420 of process 400 provides a result of said filtering. In one embodiment, the result may include one or more of displaying, printing and storing the plurality of logging information elements corresponding to the filtering criteria. In yet another embodiment, the result may be utilized to trace paths related to the logging result. To that end resulting data may be compatible with other trace applications.

Referring now to FIG. 4B, process 425 may be initiated by receiving program code at block 430. Similar to process 400, process 425 may include defining filter criteria at block 435, filtering based on the filtering criteria at block 440 and providing a filtering result as depicted block 445. According to another embodiment, process 425 may provide for one or more of debugging, tracing and analysis of program code received at block 430 through logging information provided in filtering result block 445. Result block 445 may enable a user to locate benchmarks of development in the program code, including a point in program code last modified. According to another embodiment, process 425 may provide processing of program code to reveal log data filtered to meet the needs of different audiences. As such, an observed display of logging information elements may provide insight into program code execution. In one embodiment, output of block 430 may be performed substantially in real time.

Referring to FIG. 4C, process 450 is depicted according to one more embodiments of the invention. Process 450 may be initiated through establishment of program code modules at block 455. As described above in FIG. 2, each branch of program code may be labeled or identified by a module tag (e.g., module tags $210_{1-n}$). Module tags may correspond to a particular process or function module associated with the program codes. In one embodiment, module tags may be used as filtering criteria. It may be appreciated that module tags may be assigned as one or more of system generated global modules and developer defined modules. Similar to process 400, process 450 may include inserting a plurality of logging information elements into program code at block 460. Process 450 may include defining compile-time filtering criteria at block 465, and filtering based on the compile-time filtering criteria at block 470. In one embodiment, output from filtering based on compile-time criteria may be applied to an output device. Further, process 450 may include defining run-time filtering criteria as depicted at block 475, and filtering based on the run-time filtering criteria at block 480. Process 450 as shown may include providing a result at block 480. According to another embodiment, process 450 may provide additional layers of filtering, such that program code may be filtered a plurality of times associated with a plurality of filtering criteria.

Figure 5:
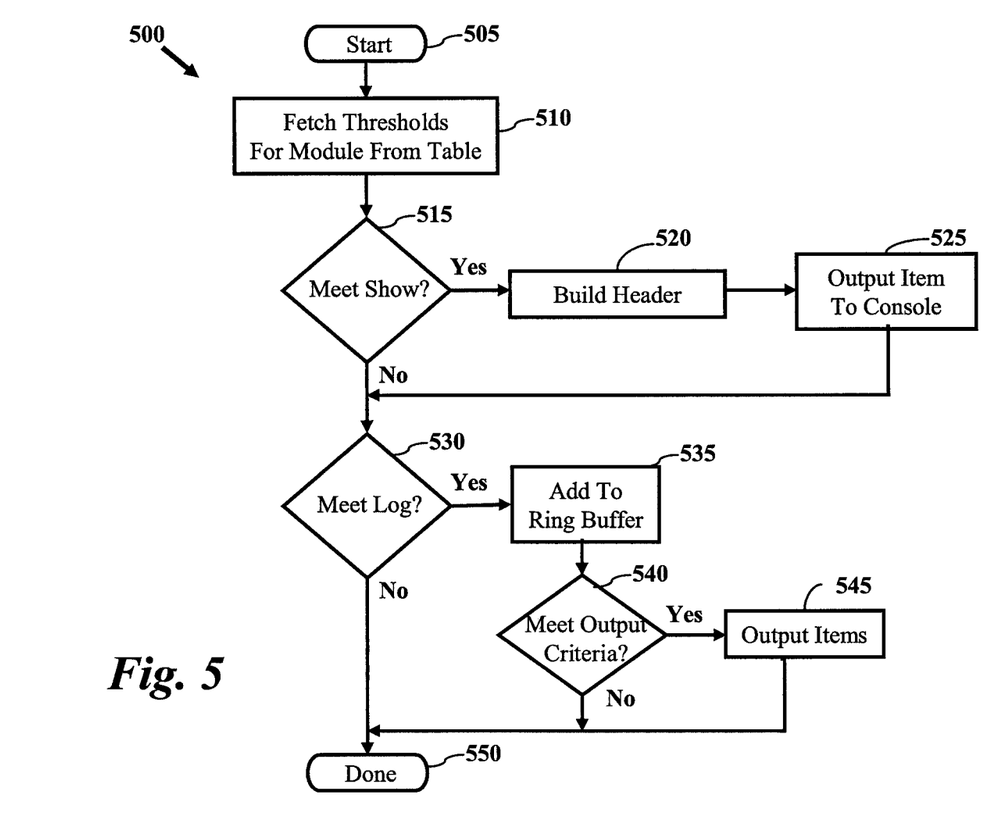
FIG. 5 depicts a process of outputting filtered results, according to one embodiment.

Referring now to FIG. 5, process 500 is depicted for providing logging information according to another embodiment of the invention. Process 500 may be preformed during run-time of program code. As such, process 500 may be initiated in start block 505. Process 500 may be configured to parse logging information elements and use module index fields (e.g., module index 120) to access threshold values. At block 510, at least one threshold for a module may be retrieved from the index database (e.g., index database 315). According to one embodiment, a threshold may be defined as described above in more detail with reference to FIGS. 4A-4C. In one embodiment, a developer may use a threshold utility application (e.g., utility application 350) to review and modify thresholds for each module. To that end, threshold settings may be preserved by the index database and made available during run-time. Process 500 may be configured to provide at least one of a show threshold and log threshold. In one embodiment, the show and log thresholds may each correspond to a severity level as provided in Table 1. At block 515, program code logging information elements may be filtered based on the show threshold. Logging information elements meeting or exceeding the show threshold at block 530 may be used to build a header string at block 520. In one embodiment, the header file created at block 520 may be generated using data previously determined by an indexer application (e.g., indexer application 310), during compile-time using index values and strings stored in an index database (e.g., index database 315). Header strings created at block 520 and associated formatted string files stored in the index database may be output to an output console (e.g., output device 330) at block 525. Logging information elements not meeting the show threshold may be disregarded at block 515.

According another embodiment, process 500 may include filtering program code for logging information elements that meet or exceed a log threshold at block 530. Logging information elements meeting of exceeding the log threshold may be added to a ring buffer (e.g., ring buffer 335) at block 535. Process 500 may be configured to temporarily store logging information elements using the ring buffer. If the ring buffer is full at the time a logging information element is copied to the ring buffer, at block 535, the oldest entry in the ring buffer may be discarded. At block 540, ring buffer contents meeting an output threshold may be provided for output to memory (e.g., memory device 340) or an analysis device (e.g., analysis device 345). According to another embodiment of the invention Logging information elements meeting the output threshold may be stored to provide data pertaining to encountering a sever error, a full ring buffer or exceeding a predetermined time. As such, the output threshold may correspond to a severity level as provided in Table 1. Process 500 may be terminated at block 555.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing logging information associated with development of executable program code, the method comprising the acts of:
    inserting a plurality of logging information elements into the program code, the plurality of logging information elements having at least one logging parameter associated with the program code;
    defining filtering criteria corresponding to the at least one logging parameter, the filtering criteria including at least one predetermined threshold for the at least one logging parameter;
    filtering the program code based on the filtering criteria;
    providing a result of the filtering including a subset of the plurality of logging information elements corresponding to the filtering criteria and meeting or exceeding the predetermined threshold, and
    compiling the subset of the plurality of the logging information elements corresponding to the filtering criteria and meeting or exceeding the predetermined threshold into a formatted string;
    wherein the result includes information indicating at least one of a module and a source code location corresponding to where each of the subset of the plurality of logging information elements is inserted into the program code.

2. The method of claim 1, wherein inserting a plurality of logging information elements comprises issuing a function call, the function call exhibiting low impact on size and execution time of the program code.

3. The method of claim 1, wherein the at least one logging parameter comprises at least one of a flag, a severity indicator, a module tag, a file index, a line number and a development message.

4. The method of claim 1, wherein defining filtering criteria comprises defining a range of values corresponding to the at least one logging parameter.

5. The method of claim 1, wherein filtering the program code further comprises filtering the program code, during compiling of the program code, based on the compile-time filtering criteria.

6. The method of claim 1, wherein filtering the program code further comprises filtering the program code, while operating the program code, based on the run-time filtering criteria.

7. The method of claim 1, wherein providing the result of the filtering comprises at least one of displaying, printing, and storing the result.

8. The method of claim 1, further comprising assigning a module tag file to each branch of the program code, wherein the module tag file is associated with the at least one logging parameter.

9. The method of claim 1, wherein the filtering criteria relate to at least one of a benchmark of development in the program code and a need of an audience of the result.

10. The method of claim 1, further comprising generating the formatted string using a macro definition file if the predetermined threshold is met or exceeded.

11. The method of claim 1, wherein the logging parameter associated with the program code includes at least one flag parameter for indicating a presence of the at least one logging parameter.

12. A system for providing logging information associated with development of executable program code comprising:
  a user input configured to receive a plurality of logging information elements for insertion into the program code, the plurality of logging information elements having at least one logging parameter associated with the program code;
  a memory containing processor-executable instructions for providing logging information associated with the logging information elements;
  a processor electrically coupled to the memory and the user input, the processor configured to execute the processor-executable instructions to:
    receive filtering criteria corresponding to the at least one logging parameter, the filtering criteria including at least one predetermined threshold for the at least one logging parameter;
    filter the program code based on the filtering criteria;
    provide a result of the filtering including a subset of the plurality of logging information elements corresponding to the filtering criteria and meeting or exceeding the predetermined threshold, and
    compile the subset of the plurality of the logging information elements corresponding to the filtering criteria and meeting or exceeding the predetermined threshold into a formatted string,
    wherein the result includes information indicating at least one of a module and a source code location corresponding to where each of the subset of the plurality of logging information elements is inserted into the program code.

13. The system of claim 12, wherein the user input is configured to receive an issued function call for insertion of the plurality of logging information elements, the function call exhibiting low impact on size and execution time of the program code.

14. The system of claim 12, wherein the at least one logging parameter comprises at least one of a flag, a severity indicator, a module tag, a file index, a line number, and a development message.

15. The system of claim 12, wherein filtering criteria comprises a range of values corresponding to the at least one logging parameter.

16. The system of claim 12, wherein the processor executable instructions to filter the program code further comprise processor executable instructions to filter the program code, during compiling of the program code, based on the compile-time filtering criteria.

17. The system of claim 12, wherein the processor executable instructions to filter the program code further comprise processor executable instructions to filter the program code, while operating the program code, based on the run-time filtering criteria.

18. The system of claim 12, wherein the processor executable instructions to provide a result of the filtering comprise processor executable instructions for at least one of displaying, printing and storing the result.

19. The system of claim 12, further comprising processor executable instructions to assign a module tag file to each branch of the program code, wherein the module tag file is associated with the at least one logging parameter.

20. The system of claim 12, wherein the filtering criteria relate to at least one of a benchmark of development in the program code and a need of an audience of the result.

21. The system of claim 12, wherein the processor is configured to execute the processor-executable instructions to generate the formatted string using a macro definition file if the predetermined threshold is met or exceeded.

22. The system of claim 12, wherein the logging parameter associated with the program code includes at least one flag parameter for indicating a presence of the at least one logging parameter.

23. A method for debugging program code, the method comprising the acts of:
  receiving program code, wherein the program code comprises a plurality of logging information elements, the plurality of logging information elements having at least one logging parameter;
  receiving filtering criteria corresponding to the at least one logging parameter, the filtering criteria including at least one predetermined threshold for the at least one logging parameter;
  filtering the program code based on the filtering criteria;
  providing a result of the filtering including a subset of the plurality of logging information elements corresponding to the filtering criteria and meeting or exceeding the predetermined threshold, and
  compiling the subset of the plurality of the logging information elements corresponding to the filtering criteria and meeting or exceeding the predetermined threshold into a formatted string,
  wherein the result includes information indicating at least one of a module and a source code location corresponding to where each of the subset of the plurality of logging information elements is inserted into the program code.

24. The method of claim 23, wherein the plurality of logging information elements correspond to a plurality of function calls, the function calls exhibiting low impact on size and execution time of the program code.

25. The method of claim 23, wherein the at least one logging parameter comprises at least one of a flag, a severity indicator, a module tag, a file index, a line number, and a development message.

26. The method of claim 23, wherein receiving filtering criteria comprises defining a range of values corresponding to the at least one logging parameter.

27. The method of claim 23, wherein filtering the program code further comprises filtering the program code, during compiling of the program code, based on a compile-time filtering criteria.

28. The method of claim 23, wherein filtering the program code further comprises filtering the program code, while operating the program code, based on a run-time filtering criteria.

29. The method of claim 23, wherein the providing a result of the filtering comprises at least one of displaying, printing and storing the result.

30. The method of claim 23, further comprising assigning a module tag file to each branch of the program code, wherein the module tag file is associated with the at least one logging parameter.

31. The method of claim 23, wherein the filtering criteria relate to at least one of a benchmark of development in the program code and a need of an audience of the result.

32. The method of claim 23, further comprising generating the formatted string using a macro definition file if the predetermined threshold is met or exceeded.

33. The method of claim 23, wherein the logging parameter associated with the program code includes at least one flag parameter for indicating a presence of the at least one logging parameter.

* * * * *

UNITED STATES PATENT AND TRADEMARK OFFICE
CERTIFICATE OF CORRECTION

PATENT NO. : 8,719,798 B2
APPLICATION NO. : 11/832584
DATED : May 6, 2014
INVENTOR(S) : Unger Page 1 of 1

It is certified that error appears in the above-identified patent and that said Letters Patent is hereby corrected as shown below:

In the CLAIMS:
Claim 5, column 9, line 6, after "on" delete "the".
Claim 6, column 9, line 10, after "on" delete "the".
Claim 16, column 10, line 11, after "on" delete "the".
Claim 17, column 10, line 16, after "on" delete "the".

Signed and Sealed this
Fourteenth Day of October, 2014

Michelle K. Lee
*Deputy Director of the United States Patent and Trademark Office*